United States Patent [19]

Böhme et al.

[11] 4,421,445

[45] Dec. 20, 1983

[54] OPERATING ARM FOR A MANIPULATOR WITH LENGTH ADJUSTMENT BY TELESCOPING MEANS

[75] Inventors: Georg Böhme, Weingarten; Wolfgang Köhler, Karlsruhe; Manfred Salaske, Eggenstein, all of Fed. Rep. of Germany

[73] Assignee: Kernforschungszentrum Karlsruhe G.m.b.H., Karlsruhe, Fed. Rep. of Germany

[21] Appl. No.: 332,447

[22] Filed: Dec. 21, 1981

[30] Foreign Application Priority Data

Dec. 31, 1980 [DE] Fed. Rep. of Germany ....... 3049577

[51] Int. Cl.³ .............................................. B25J 3/00
[52] U.S. Cl. .......................................... 414/4; 414/1
[58] Field of Search ................... 414/1, 4, 5, 718, 735, 414/751

[56] References Cited

U.S. PATENT DOCUMENTS 3,219,200 11/1965 Ainsworth .............................. 414/4
3,262,593 7/1966 Hainer ............................. 414/751 X
4,062,455 12/1977 Flatau ................................. 414/735

FOREIGN PATENT DOCUMENTS 970441 9/1964 United Kingdom .................... 414/1
293432 10/1968 U.S.S.R. ................................. 414/1

Primary Examiner—Joseph E. Valenza
Assistant Examiner—Terrance L. Siemens

[57] ABSTRACT

An operating arm for a manipulator with length adjustment by telescoping means has a transmission carriage slidably disposed in an outer telescopic tube and a number of concentric tubes are rotatably supported in the center of the transmission carriage for transmitting motion for various functions of the operating arm by means of bearings which are supported coaxially and on top of each other on a roller housing rotatably supported in the transmission carriage. The innermost of the concentric tubes is connected to the roller housing while the others have circumferential spur gear structure in engagement with spur gears and drive shafts extending into the outer tube outside said spur gear structures for operating said other concentric tubes.

7 Claims, 9 Drawing Figures

OPERATING ARM FOR A MANIPULATOR WITH LENGTH ADJUSTMENT BY TELESCOPING MEANS

FIELD OF THE INVENTION

The invention relates to an operating arm for a manipulator with adjustable telescoping means consisting of a number of concentric tubes which are rotatable for performing the various functions of the operating arm and are driven by drive shafts disposed in the upper part of the telescoping means.

BACKGROUND OF THE INVENTION

Manipulator arms with provisions for movement in various ways which have mechanical drive elements for the transmission of movements and forces or torques disposed within are mainly used in connection with mechanical master-slave manipulators. The mechanical drive elements of such manipulators are usually steel cables and/or steel bands, however, in the area of the joints and the gripper roller chains are also in use.

Such designs are relatively simple and the movable parts have only small masses. The operator needs to overcome only small friction forces and during acceleration and deceleration he feels only small inertia forces. The manipulator is very sensitive and the operator usually acquires great skill and handling speed. Such apparatus are suitable mainly for hot cells in which experiments are performed. Master-slave manipulators of this type which use cables and bands however have the following disadvantages. During strenuous operations such as the dismantling of fuel elements from nuclear reactors or in production facilities with large throughput which require long uninterrupted periods of operation, the present apparatus are overly strained. In order for the arms to be usable for many applications there need to be six possibilities for movement and they need to be relatively small for many applications so that the cables have to have relatively small diameters and the bands have to be relatively narrow. During high loads and long periods of operation the forces applied to the cables and bands and the cable and band rollers are sometimes large enough to cause permanent deformations which, according to long-time operating experience, are the reason for most failures.

As a result of such failures however, frequent maintenance and repair work is required which not only interrupts operations but frequently requires airlock transfer operations which have always contamination risks and increased radiation exposure for the workers associated therewith.

In order to avoid the main disadvantage of the present master-slave manipulator, that is strain of the cables, rotatable shafts and gears are provided for the transmission of forces or respectively, the arm functions. Although such an arrangement is more elaborate and expensive and although it provides for larger masses and larger forces to be overcome by the operator, particularly during idle operations, the idle movement forces and inertia forces may be limited to such a degree that they are tolerable for heavy loads.

Considering past designs it would be desirable to provide a manipulator arm which exactly transmits all functions and forces and at the same time can be extended or retracted. Strains leading to permanent stretching should be impossible even during high loads and even elastic stretching and the position deviations between parts of the slave and the master arm associated therewith should be only very small so that a feeling of contact with the object to be handled is obtained, resulting in secure manipulation of the object. Particular consideration must be given to the joint where rotational movement and, at the same time, axial movement of the arm have to be transmitted.

SUMMARY OF THE INVENTION

In an operating arm for a manipulator with length adjustment by telescoping means a transmission carriage is slidably disposed in an outer telescopic tube and a number of concentric drive tubes are rotatably supported in the center of the transmission carriage for transmitting motion for various functions of the operating arm from the control side to the arm and vise thereon. The concentric tubes are supported by bearings which are arranged coaxially and on top of each other on a central roller housing rotatably mounted in the transmission carriage. The innermost concentric tube is connected to the roller housing for rotation therewith while the other tubes have circumferential spur gear structures which are in engagement with spur gears mounted on drive shafts extending into the outer tube outside the spur gear structures for rotating the outer concentric tubes which transmit motion to the lower end of the arm and the vise mounted thereon.

Preferably, the transmission carriage consists of a housing with top and bottom covers and the outermost of the concentric tubes is additionally supported by a bearing mounted centrally on the bottom cover of the transmission carriage and the bearings for the other concentric tubes are mounted on the spur gear structure of each adjacent inner concentric tube.

It is furthermore proposed that a drive chain is connected with one end to the upper side of the transmission carriage top cover which chain extends over a driven sprocket wheel which is supported on an intermediate sheet in the outer telescopic tube above the transmission carriage and which is driven by an additional drive shaft for raising and lowering the transmission carriage in the outer telescopic tube.

It is advantageous if the transmission carriage has a recess formed at the outside thereof and a counterweight is slidably supported in the outer telescopic tube by means of a rail extending in axial direction through the recess and guiding the counterweight during movement thereof, the counterweight being engaged with the rail by rollers and being connected to the other end of the chain.

It is finally proposed that the transmission carriage is axially guided in the outer telescopic tube by means of rollers abutting axial rails mounted in spaced relationship around the inner circumference of the outer tube. The rails are prismatic in shape and the transmission carriage has corresponding recesses receiving the prismatic rails.

The central roller housing is supported on the top cover by a central antifriction bearing and the innermost concentric tube is rotatably supported on the central roller housing by another antifriction bearing also supported on the roller housing and the drive shafts consist of inner and outer square tubes slidably extending through the roller housings so as to transmit rotary motion from the roller housings to the square tubes.

The manipulator according to the invention is operating very reliably with only very little wear so that little servicing and repair work becomes necessary and few air lock transfer operations for this purpose are required.

SHORT DESCRIPTION OF THE DRAWINGS

FIG. 1 (A and B) shows the manipulator arm in cross-section on a reduced scale,

FIG. 2 shows in principle the movement transmission links (Z movement) between master and slave manipulator arms, FIG. 3 shows, in principle, the movement of the vise, FIG. 4 shows, in principle, rotation and bending of the manipulator vise, FIG. 5 shows, in principle, rotation of the manipulator arm wherein the functions shown in FIGS. 2 to 5 are transmitted by a transmission of FIG. 6, and FIG. 6 shows the area A of FIG. 1 on a larger scale, FIG. 7 shows a cross-section along line CC of FIG. 6, however on a somewhat smaller scale, and FIG. 8 shows a cross-section along line DD of FIG. 6 also on a somewhat smaller scale than FIG. 6.

DESCRIPTION OF THE PREFERRED EMBODIMENT

Figure 1A:
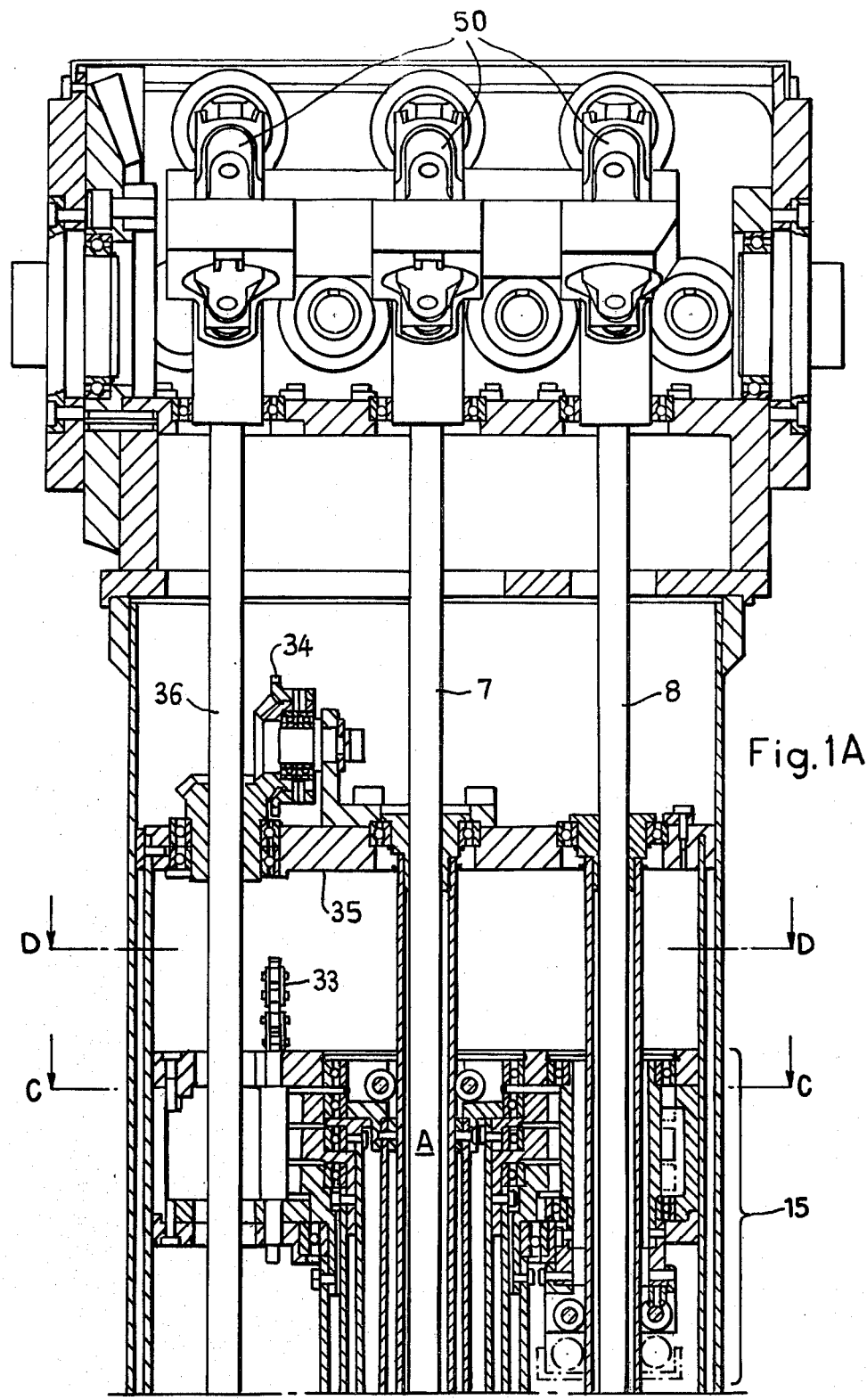

FIGS. 1A and B show an arm of a master-slave manipulator, which, essentially, consists of an inner telescopic tube 1 which is axially movably supported within an outer telescopic tube 2. At its lower end 49 the manipulator arm carries a vise 51 whose various movements can be controlled by the drive shafts 50 extending into the top end of tube 2. FIGS. 1A and B show tube 2 with double walls which permit axial movement of the intermediate sheet 35 but this feature need not be considered in connection with the present invention.

Figure 2:
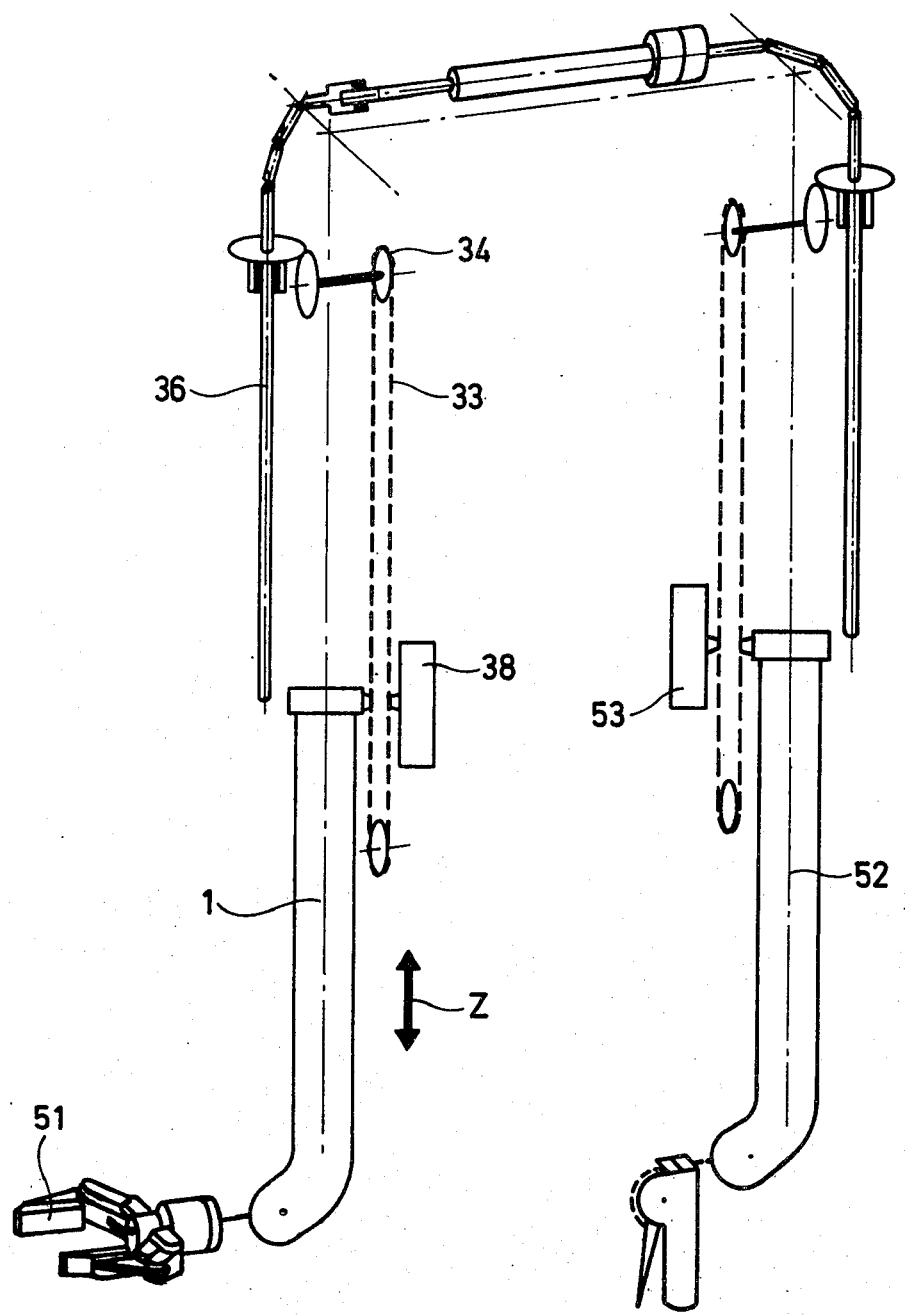

For an understanding of the present invention, reference is now made to FIGS. 2 to 5 where it is shown how the various modes of operation are transmitted to the vise 51. The so-called Z movement, that is telescopic extension of the vise 51 and the inner telescopic tube 1, is schematically shown in FIG. 2. During operation the telescopic tube 1 has to move in the same direction as the tube 52 moved by an operator at the control side. The telescopic tube 1 has a counterweight 38 operatively associated therewith such that it moves in the upper outer telescopic tube portion in a direction opposite the direction of movement of the tube 1. Similarly is the counterweight 53 associated with the tube 52 at the control side of the manipulator. The movement of the tube 52 is transmitted by means of a drive shaft 36 to a sprocket wheel 34 which drives a chain 33 operating a slidable transmission carriage 15 receiving the inner telescopic tube 1 as described later in greater detail. In addition to this Z movement as shown in FIG. 2, there are additional modes of movement which are explained in FIGS. 3, 4 and 5.

Figure 3:
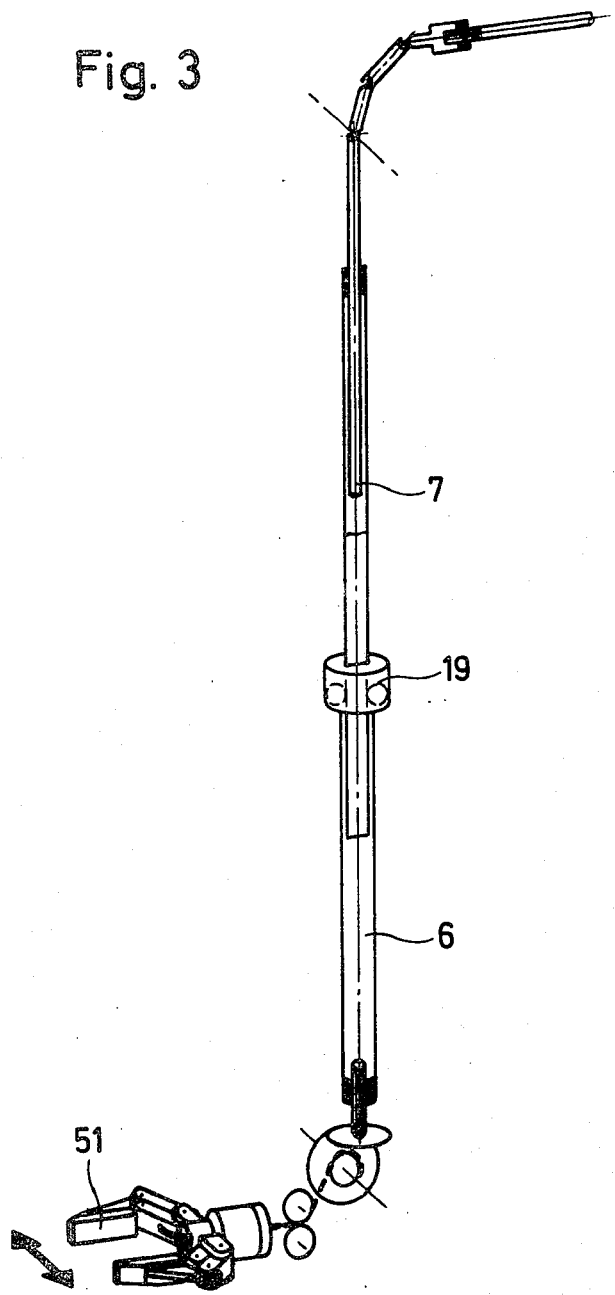

FIG. 3 shows the transmission of the gripping movement of the vise 51 which is transmitted from the top through a central drive shaft 7 to the concentric telescopic tube 6 while they remain axially movable relative to each other. As a joining member serves a roller housing 19 which transmits rotation while permitting axial movement.

Figure 4:
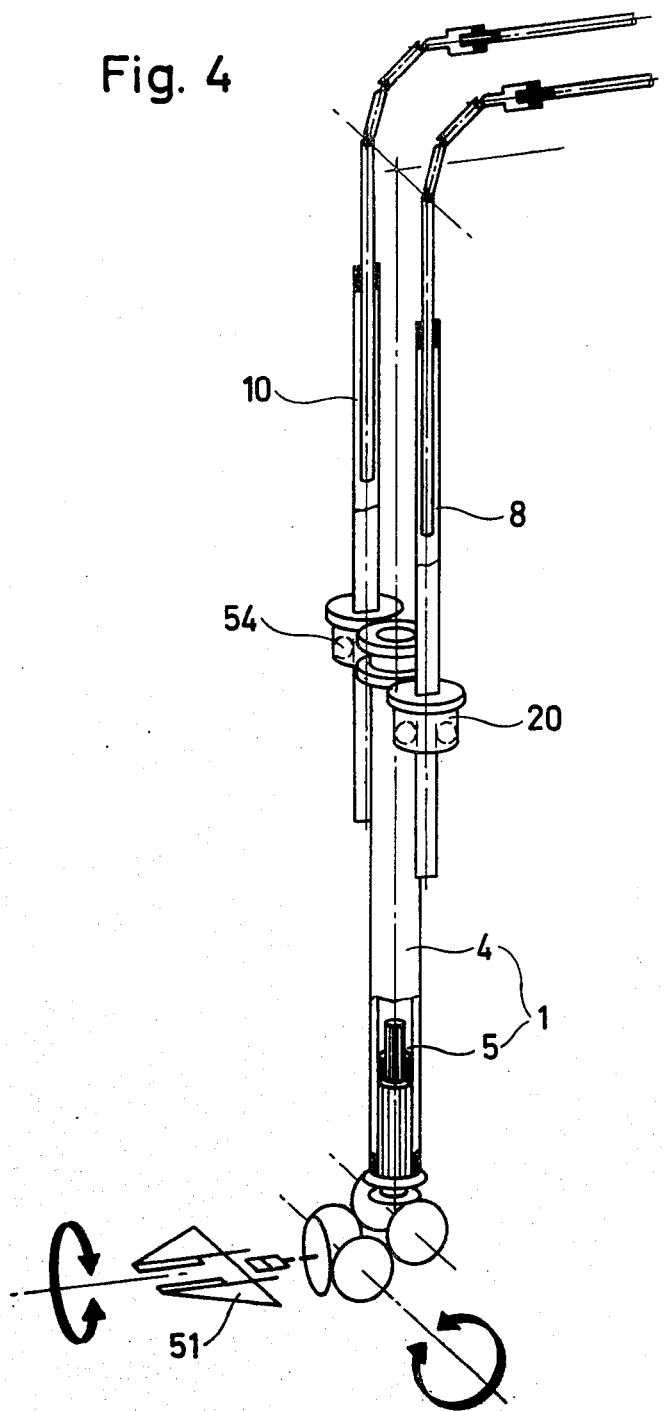
Figure 5:
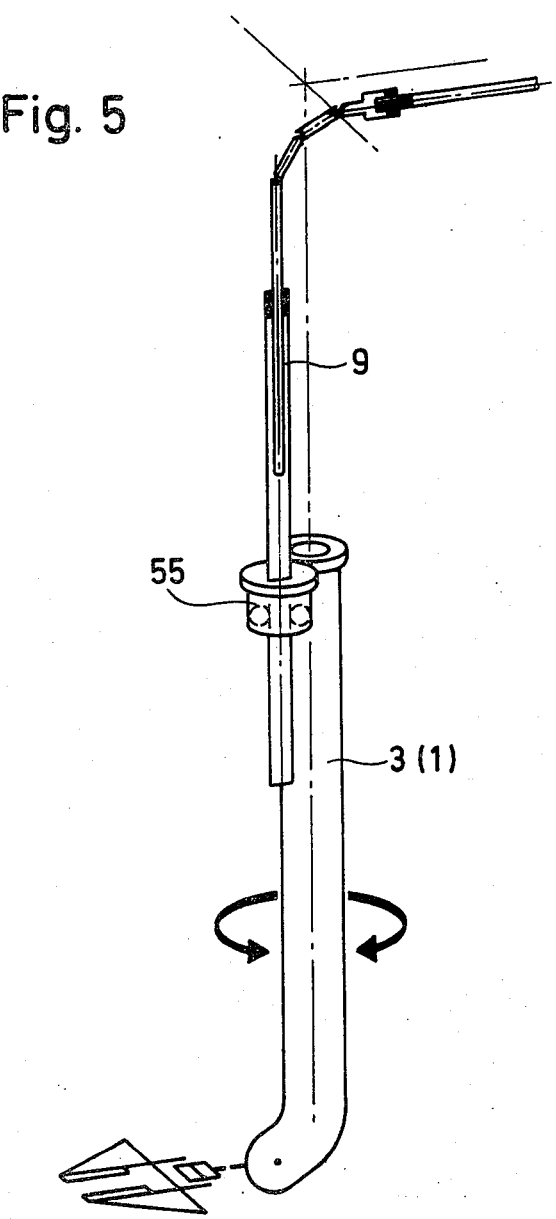

FIG. 4 shows additional drives used for rotational and pivotal movement of the vise. Drive shafts 8 and 10 transmit the movements from the control side to the concentric tube sections 4 and 5 of the inner telescopic tube structure 1. In the same manner, movement of the drive shaft 9 transmits rotational movement of the arm from the control side to the outer concentric tube 3 of the telescopic means as shown in FIG. 5. Roller housings 20, 54 and 55 provide also here for axial movability, that is axial extension for all elements in the drive train.

Figure 6:
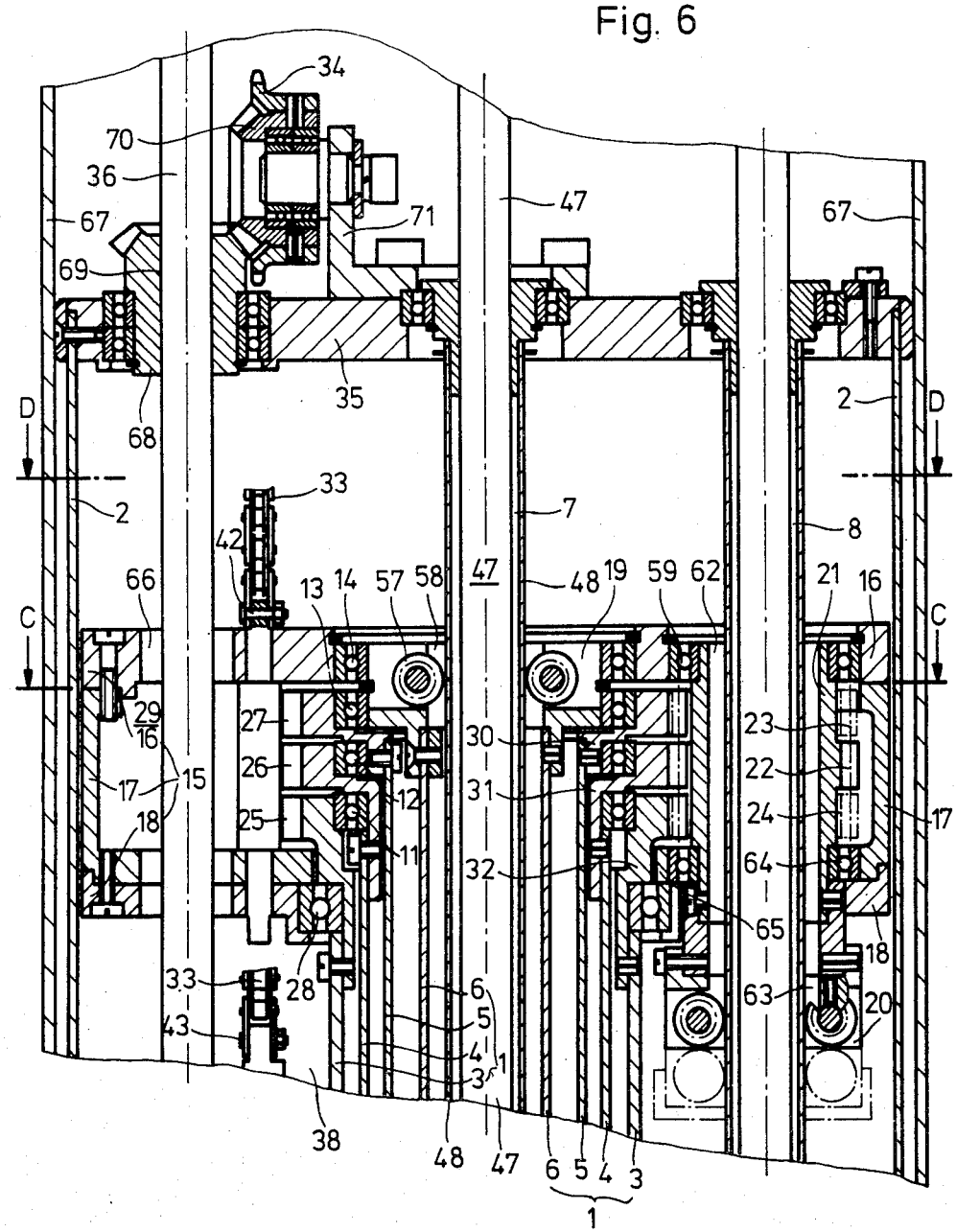
Figure 7:
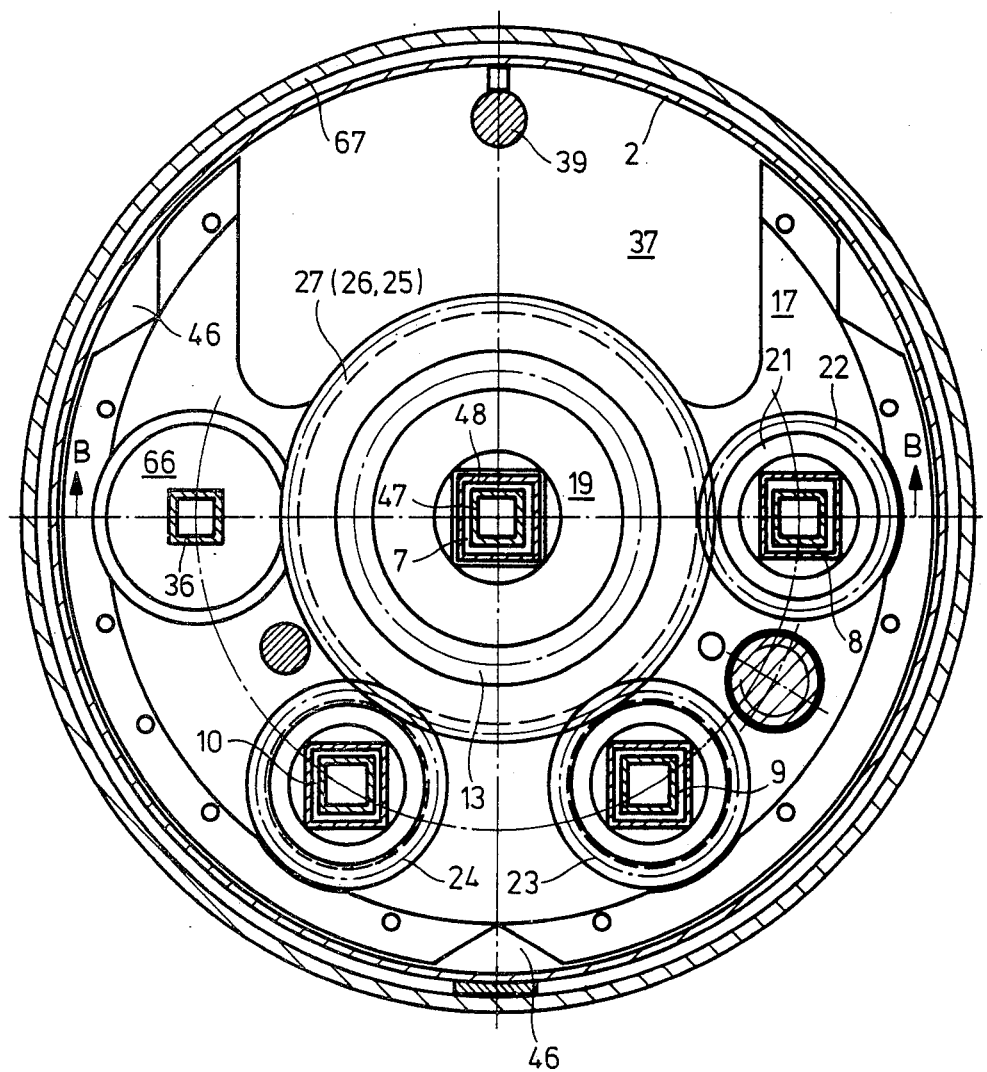
Figure 8:
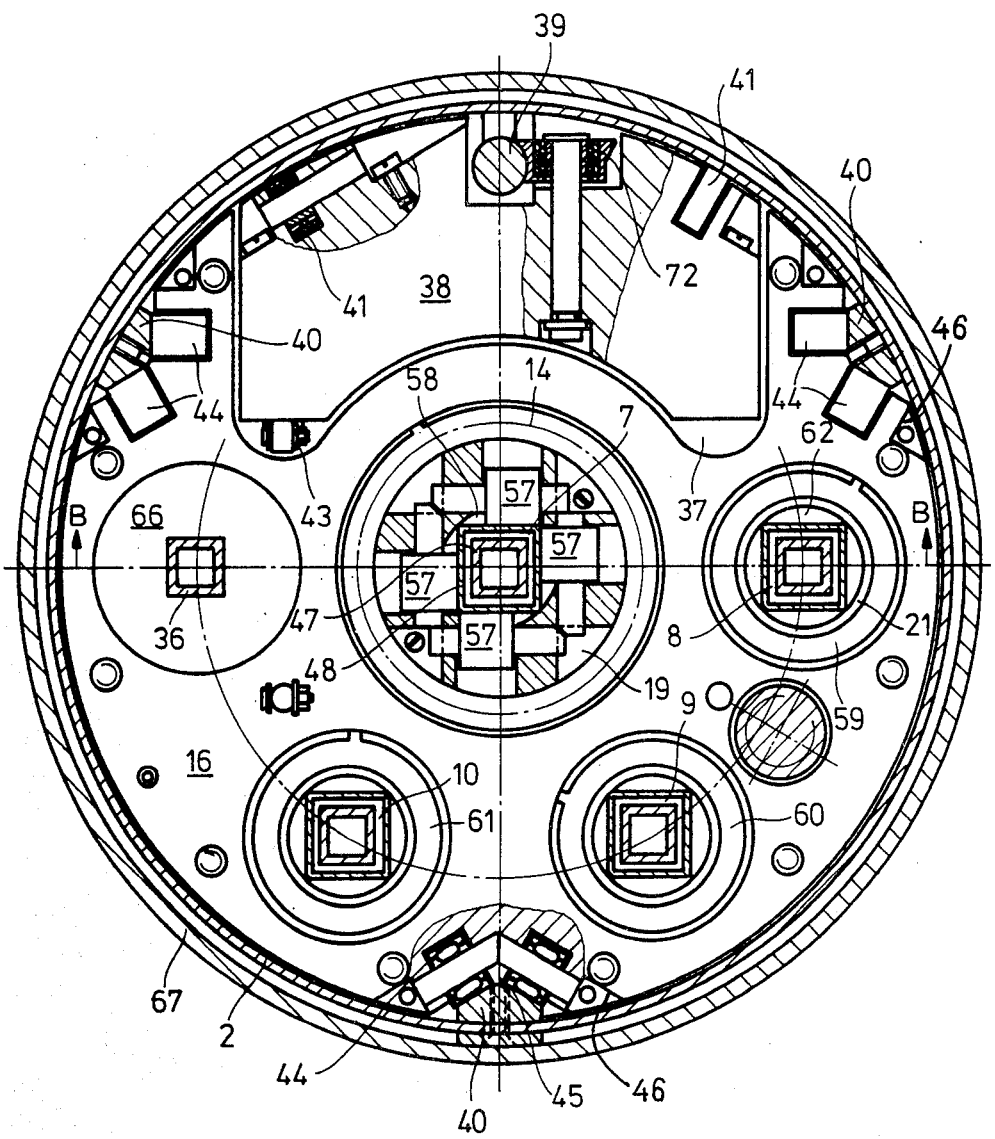

The most important feature of the present invention is shown in FIG. 6 and, in cross-section, in FIGS. 7 and 8 at an enlarged scale. It resides in a slidably supported transmission carriage 15, which encloses all the elements of the features described previously. It provides for the bearing support of the inner telescopic tube 1 and all the transmission elements for the rotation of its concentric telescopic tube sections 3, 4, 5 and 6.

The lower or inner telescopic tube section 1 consists of four concentric tubes of a light metal alloy of which the innermost tube 6 is adapted to transmit motion for the movement of the vise, and the next radially adjacent tubes 5 and 4 are for the transmission of vise rotational and pivotal movement. The outer tube 3 serves the rotation of the telescopic arm and, at the same time, is the enveloping tube. It is guided at the lower end of the outer telescopic tube 2 by rollers 56 (FIG. 1) and is rotatably supported within the transmission carriage 15 on the transmission bottom cover 18 by an antifriction bearing 28 which takes up axial forces.

Figure 1B:
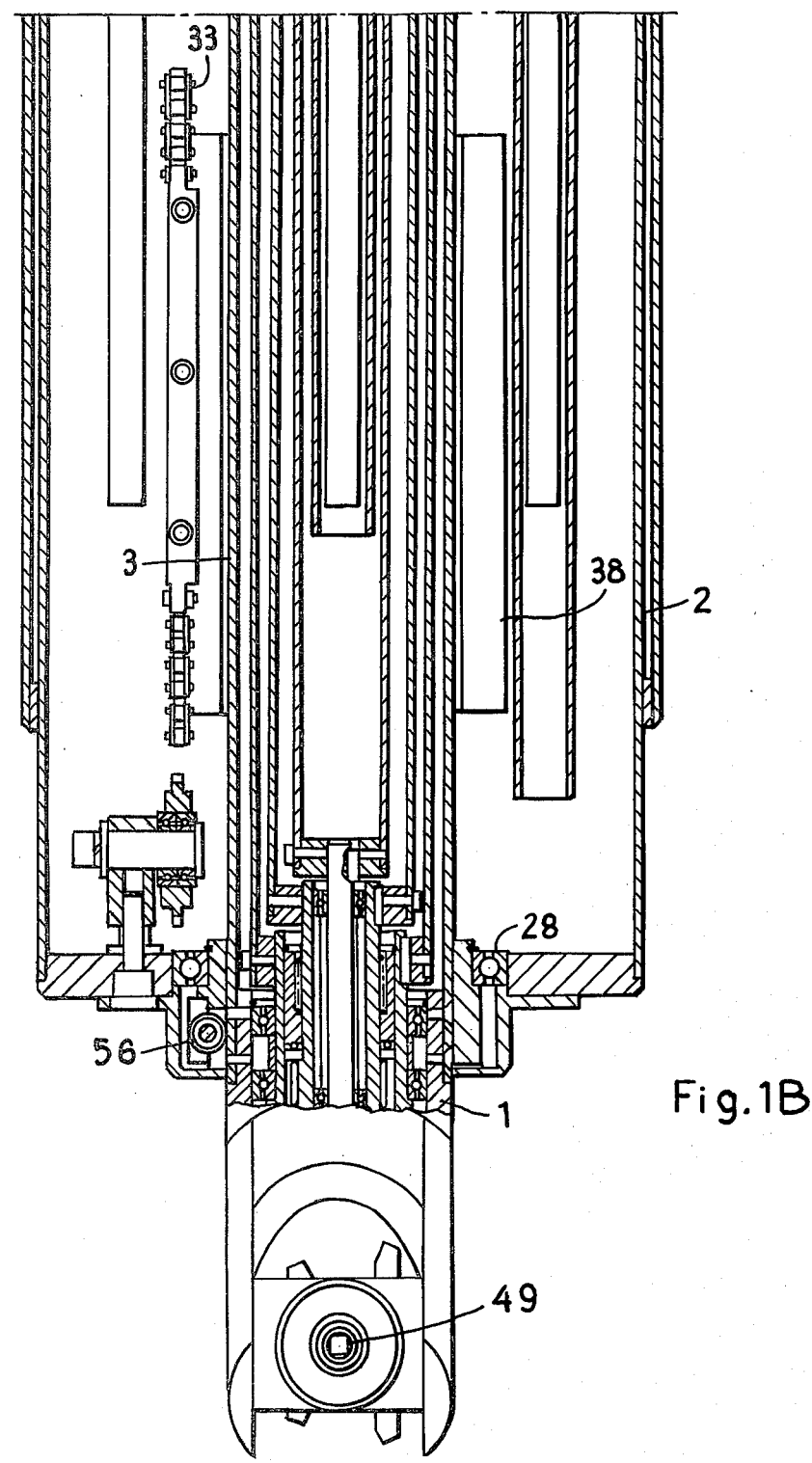

The transmission carriage 15 consists of a transmission housing 17 enclosing a space 29, a top cover 16 and a bottom cover 18 bolted to the housing. The top cover 16 receives a central antifriction bearing 14 which surrounds the intermediate roller housing 19 and supports it rotatably in the top cover 16. Within the roller housing 19 there are four rollers 57 supported rotatably about axes which are arranged normal to each other such that they define a square space 58 therebetween slidably receiving the square tube 48 of the rotatable drive shaft 7 which serves to control movement of the vise (FIG. 3). Within the outer square tube 48 there is an inner square tube 47 which represents the upper portion of the drive above an intermediate panel 35 and which is rotatable from the control side by means of drive shaft 50 (FIG. 1). At its lower end the roller housing 19 has another antifriction bearing 13 mounted thereon which is independent of bearing 14 and provides for the inner upper support of the concentric tubes 5, 4 and 3.

In the annular area around the central antifriction bearing 14 the top cover 16 supports additional antifriction bearings 59, 60 and 61 (FIG. 8) which represent the upper bearing supports for the outer drive shafts 8, 9 and 10 on the transmission carriage 15. The particular construction of these bearings and the associated lower bearings is the same and shown for an example in connection with drive shaft 8 in FIG. 8. The support bearings which are not visible in FIG. 8 as well as the roller housings 54 and 55 associated therewith (FIG. 5 and FIG. 4) are identical. A tube section 21 which has the form of an axially extending hollow cylinder is received in the inner race of the antifriction bearing 59 and the drive shaft 8 extends through the interior 62 of the tube section 21 which abuts at its lower end the portion 63 of the roller housing 20. A second antifriction bearing 64, which provides rotatable support for tube section 21 and the other associated rotatable shafts, is mounted on the tube section 21 above the roller housing portion 63 and is supported on the lower wall 65 of the transmission carriage 15. Rotation of the drive shaft 8 will cause rotation of the roller housing 20 as well as rotation of the tube section 21. At the same time they may be moved axially along the drive shaft 8. Between the bearings 59 and 64, the tube section 21 carries a spur gear structure 22 which transmits rotational movement to the tube section 4 of the central concentric tubes. The spur gear structures 23 and 24 shown in dash-dotted lines serve for the transmission of rotational movement of the drive shafts 9 and 10 (FIGS. 8 and 9, not visible in FIG. 6) to the associated tube sections 3 and 5. The tube section or sections 21 extend through the transmission carriage bottom cover 18 and are rotatable without contacting it. As already mentioned, the bottom cover 18 supports also the central lower antifriction bearing 28 which serves as the main bearing for rotatably supporting the inner telescopic tube 1. Beside the bearing or rotary transmission structures described, the transmission carriage 15 has an opening 66 through which the lifting drive shaft 36 extends whose function will be described later.

As mentioned previously the concentric tube sections 3, 4, 5 and 6 are all supported in the housing space 29 of the carriage between the antifriction bearings 13 and 28. For this purpose each of the concentric tube sections 4, 5 and 6 protrudes upwardly from the adjacent outer tube section and the protruding sections carry spur gear supports 30, 31 and 32 provided with spur gear structures 27, 26 and 25 which are disposed on top of each other and which all have the same diameter. The spur gear supports 30, 31 and 32 are supported on top of each other by the antifriction bearings 11 and 12 and the spur gear structures are in engagement with spur gears 23, 22 and 24 such that each of the concentric tube sections 3, 4 and 5 may be rotated by its associated drive shaft 9, 8 and 10 respectively while being axially moved with the transmission carriage 15.

As shown in FIG. 8, the transmission carriage 15 is guided within the tube 67 by pairs of rollers 44 which are arranged at an angle to each other and are in engagement with angled guide rails 40 along which they roll without play, the angle rails having roof-like prism-shaped surfaces 45 to prevent rotation of the carriage 15 in the tubes 2. The guide rails 40 extend through recesses 46 at the circumference of the transmission carriage 15. Up and down movement, that is Z movement (FIG. 2), of the carriage 15 is provided for by rotation of the lifting drive shaft 36. The lifting drive shaft 36 extends through a bevel gear 68 which is rotatably supported on a support sheet 35 mounted on the upper end of the outer telescopic tube 2 which is disposed within an additional tube 67 in which tube 2 may be axially movably, or firmly, supported. The bevel gear 68 has an opening 69 of square cross-section through which the square drive shaft 36 extends slidably for driving the bevel gear 68. The bevel gear 68 is in engagement with another bevel gear 70 which has a sprocket wheel 34 associated therewith, both being together rotatably supported about an axis which is normal to the axis of lifting drive shaft 36 by means of a support bracket 71 mounted on the support sheet 35. The support sheet 35 has openings and the chain 33 placed over the sprocket wheel 34 extends through these openings and has one end 42 connected to the top cover 16 of the carriage 15 whereas its other end 43 carries the counterweight 38 adapted to move in opposition to the carriage 15 to provide for weight or inertia force balance when the inner telescopic tube is extended or retracted.

FIG. 8 shows the guiding means for the counterweight 38 which is movable past the carriage 15 through a cavity 37 formed at its circumference. The counterweight 38 is guided by a three-point support structure at the inside of the outer, that is, upper telescopic tube 2. Radial guidance is provided by a guide rod 39 which is abutted by a rail wheel 72 rotatably mounted on the counterweight 38, while the counterweight's outer rollers 41 movably support the counterweight 38 against the tube 2. A similar arrangement may be provided at the control side of the manipulator so that any inertial forces balance each other (see FIG. 2).

LISTING OF REFERENCE NUMERALS

1: Inner telescopic tube
2: Outer telescopic tube
3: Outer concentric tube
4: Concentric tube section
5: Concentric tube section
6: Concentric telescopic tube
7: Central drive shaft
8: Drive shaft
9: Drive shaft
10: Drive shaft
11: Antifriction bearing
12: Antifriction bearing
13: Antifriction bearing
14: Central antifriction bearing
15: Transmission carriage
16: Top cover
17: Transmission housing
18: Bottom cover
19: Roller housing
20: Roller housing
21: Tube section
22: Spur gear structure
23: Spur gear structure
24: Spur gear structure
25: Spur gear structure
26: Spur gear structure
27: Spur gear structure
28: Antifriction bearing
29: Housing space
30: Spur gear support
31: Spur gear support
32: Spur gear support
33: Chain
34: Sprocket wheel
35: Intermediate support sheet
36: Drive shaft
37: Cavity
38: Counterweight
39: Guide rod
40: Guide rail
41: Outer roller
42: One end of chain
43: Other end of chain
44: Roller pair
45: Rail surface
46: Recess
47: Inner square tube
48: Square tube
49: Lower end of arm
50: Drive shaft
51: Vise
52: Tube
53: Counterweight
54: Roller housing
55: Roller housing
56: Rollers
57: Rollers
58: Square space 59: Antifriction bearing
60: Antifriction bearing
61: Antifriction bearing
62: Interior of tube section 21
63: Portion of roller housing 20
64: Antifriction bearing
65: Lower wall
66: Opening
67: Tube
68: Bevel gear
69: Bevel gear opening
70: Bevel gear
71: Support bracket
72: Rail wheel

We claim:

1. An operating arm for a manipulator with length adjustment by telescoping means having an inner structure including a number of concentric tubes for transmitting the various functions of the operating arm, said concentric tubes being rotatably supported at their upper ends by antifriction bearings which are supported coaxially and on top of each other within a transmission carriage which itself is slidably disposed in an outer tube of an upper portion of the telescoping means, and which has roller housings rotatably supported thereon and drive shafts disposed outside the center of the carriage and slidably extending through the roller housing but being operatively associated therewith so as to transmit their rotation to said roller housings while sliding therein, said roller housings having spur gear structures associated therewith, and said concentric tubes having spur gear structures at their upper ends in engagement with the spur gear structures of the respective drive shafts for rotating said concentric tubes, said transmission carriage consisting of a housing with top and bottom covers, the upper side of said top cover having one end of a chain connected thereto, said chain extending over a driven sprocket which is mounted on an intermediate support sheet arranged above the transmission carriage in the outer telescopic tube and operatively connected to an additional drive shaft disposed in the outer telescopic tube to permit upward and downward movement of the transmission carriage, said transmission carriage having a recess formed at its circumference and a counterweight slidably supported in the outer telescopic tube by means of a rail extending in axial direction through said recess and guiding said counterweight during movement thereof counter to the movement of said carriage, said counterweight being engaged with said rail by rollers and being connected to the other end of said chain.

2. An operating arm as claimed in claim 1, wherein the upper bearing for the outermost of said concentric tubes is supported centrally on the bottom cover of said transmission carriage whereas the innermost of said concentric tubes extends to the top of said carriage and is connected to a roller housing which is rotatably supported in the center of the top cover of said transmission carriage, the outer tubes being mounted on the associated spur gear structure which are supported on top of each other by bearings on the spur gear structures of the adjacent inner tubes.

3. An operating arm as claimed in claim 1, wherein the weight of said counterweight corresponds to the weight of said carriage including all elements axially movable therewith.

4. An operating arm as claimed in claim 1, wherein said transmission carriage is axially guided in the outer telescopic tube by means of rollers abutting the inner surfaces of prismatic rails mounted on the inside of said outer tube.

5. An operating arm as claimed in claim 4, wherein said transmission carriage has cavities at its circumference which conform to the shape of, and receive, said prismatic rails.

6. An operating arm as claimed in claim 1, wherein said central roller housing is supported on said top cover by means of central antifriction bearing and the innermost concentric tube is rotatably supported by another antifriction bearing supported on said roller housing below said central antifriction bearing.

7. An operating arm as claimed in claim 6, wherein each of said drive shafts consist of an inner and an outer square tube, said roller housing being slidably supported on said outer square tube and said outer square tube being slidably disposed around said inner square tube to permit transmission of rotary motion from said inner to said outer square tube and from said outer square tube to the respective roller housing.

* * * * *